UNITED STATES PATENT OFFICE.

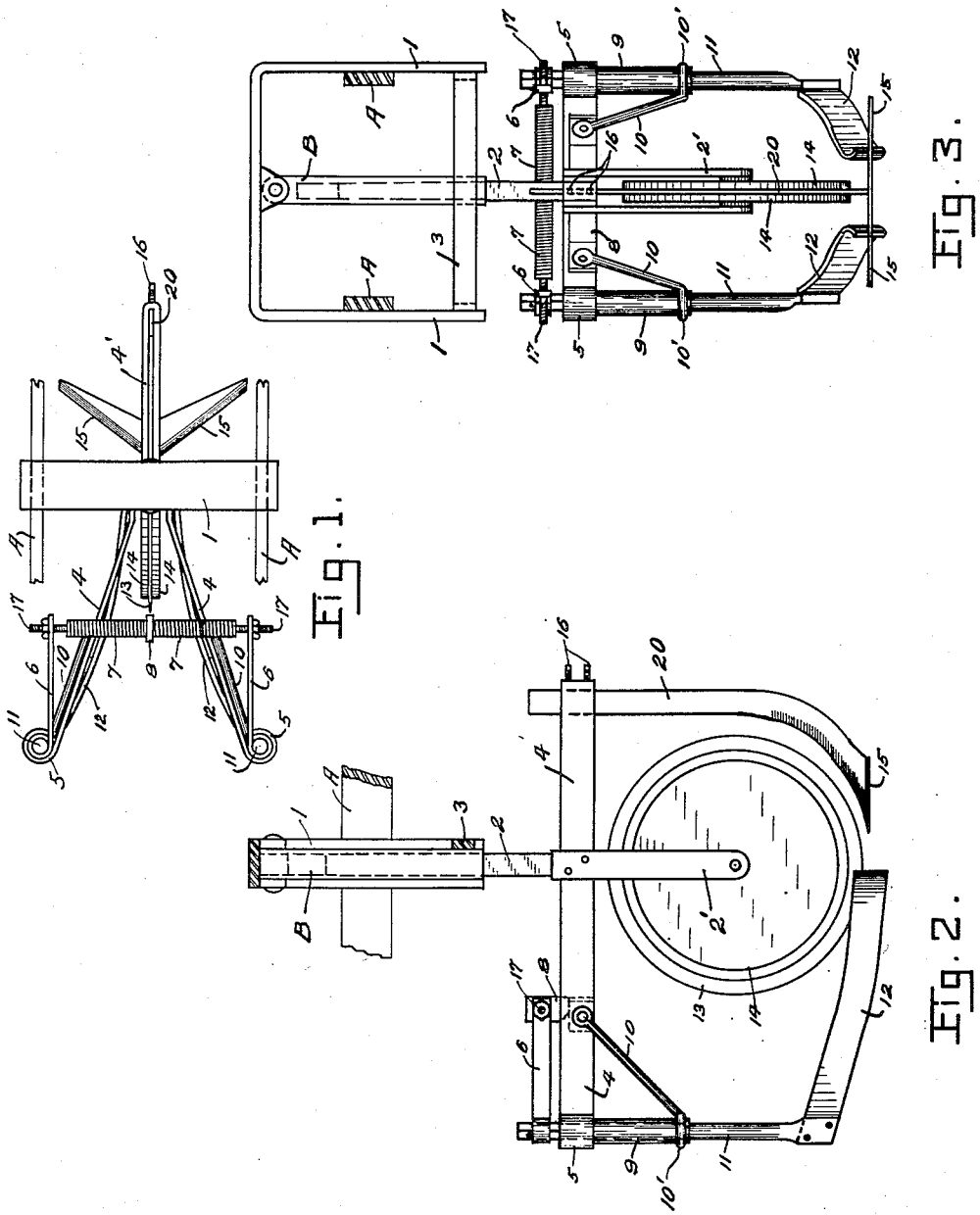

MARION A. SMITH, OF SALT LAKE CITY, UTAH.

BEET-TOPPING DEVICE.

1,308,921.  Specification of Letters Patent.  Patented July 8, 1919.

Application filed November 4, 1918. Serial No. 261,166.

*To all whom it may concern:*

Be it known that I, MARION A. SMITH, a citizen of the United States, residing at Salt Lake City, in the county of Salt Lake and State of Utah, have invented certain new and useful Improvements in Beet-Topping Devices, of which the following is a specification.

My invention relates to beet topping devices, and has for its object to provide a light serviceable device which may be attached to any beet digging machine and by which the beets may be topped while in the ground and the foliage cut from the body of the beets at the desired place regardless of whether the individual beet grew low or high in the ground with the further object of topping one or more rows of beets and regardless of whether the rows are at all places exactly parallel or that the beets may be found in a straight or crooked row.

These objects I accomplish with the device illustrated in the accompanying drawings in which similar letters and numerals of reference indicate like parts throughout the several figures and as described in the specification forming a part of this application and pointed out in the appended claims.

In the drawings in which I have shown a substantial embodiment of my invention, Figure 1 is a plan view of the device. Fig. 2 is a side elevation of the same. Fig. 3 is a rear elevation of the device.

The present invention may be attached to the beams or other horizontal portions A of the digging machine by bolting the inverted U-shaped member 1 to said members A. The centering and topping means are suspended from the middle of said U-shaped member 1 by the square sleeve member B which is pivotally suspended therefrom and a cross brace 3 is provided connecting the legs of said U-shaped member 1 and against which said member B bears. A square bar 2 is operatively carried in said sleeve B and is moved longitudinally therein by the other elements of the device passing over the crown of the beets. A metal frame is secured on and carried by said bar 2, which frame consists of two opposed angled braces 4 which are parallel at their rear end portion 4' and spaced from each other to form a socket for the upper end portion of a topping knife 20, the lower portion of which is given a forward curve and sharpened to an edge. About the middle of each of said braces 4 they pass the bifurcated portion 2' of said bar 2 and said braces and the fork of said bar are secured together. The said braces 4 are spread outwardly apart at their front ends, and formed into a collar 5, and to each of which the collar sleeve 9 is secured and in which the rocking shafts 11 are journaled. An arm 6 extends rearwardly on each of said rocking shafts 11 and preferably said arms 6 are parallel and between them are mounted the springs 7. A cross brace 8 is provided connecting the said braces 4 adjacent the said springs 7 and an upstanding portion of said cross brace 8 divides the said springs 7 whereby each of said springs 7 may be tensioned independently of the other. The angled braces 10 are provided, one end portion of each formed as a collar 10' and carried on said shafts below said collar sleeves 9 while the other end of each brace is bolted to one of said braces 4. Another arm 12 of each of said rocking shafts 11 takes the form of a curved spring and extends toward the rear of the device. A splitting foliage disk 13 is journaled in the bifurcated portions 2' of said bar 2, and outwardly projecting flanges 14 are provided on said disk 13 about one inch from the periphery of said disk to gage the depth to which said disk will cut. The lower end portion of said topping knife 20 is outwardly flanged forming two wing blades 15 thus giving the knife the appearance of crow's foot. The said topping knife is held in place between the parallel portions of said braces 4 by the set screws 16. A rod 17 is fastened between said arms 6 on which said springs 7 are carried.

The operation of my device is as follows:—

With the device attached to the digging machine by bolting the U-shaped member 1 to some horizontal pieces A of said digging machine, and with said machine drawn along and over a row of matured beets my machine will precede the digging of the beets. The tips of the foliage of the beets will be raised by the curved spring arms 12 of my device and said spring arms 12 will pass along the sides of the beets while they are still in the ground and my device will be moved laterally from side to side as may be required to center the device over the individual beets, the springs 7 yielding to lateral pressure of the arms 6 as induced by the arms 12 and communicated through the rocking shafts 11 as required, while returning the device to the normal position relative to the digging machine. The splitting disk 13 will cut through the foliage and crown of the beets to the depth the flanges 14 will allow. The said disk and the topping knife will be raised and lowered as the disk passes over the individual beet, this vertical movement of the parts being allowed by the collar sleeves 9 on the rocking shafts 11. A beet having a crown relatively high out of the ground will raise the disk 13 and all parts of the device connected with the rocking shafts 11, while said disk in passing over and through a beet growing low in the ground will ride on the ground or at least low over the said beet. The topping knife in either case will top the beets at the bottom or near the bottom of the slit cut by the disk 13 and the beet will be topped as desired.

I thus provide a new and novel means for centering the machine over the beets, and new means for automatically adjusting the topping knife to the individual beet.

Having thus described my invention and its operation I desire to secure by Letters Patent and claim:—

1. A beet topping device consisting of an inverted U-shaped frame; a sleeve vertically suspended in said frame; a bar carried in said sleeve having its lower end bifurcated; a disk journaled in the bifurcated portions of said bar; horizontally disposed braces fastened to said bar; a topping knife fastened at the end of said braces; rocking shafts journaled in portions of said braces; rearwardly projecting arms normally parallel; beet engaging arms on the lower ends of said rocking shafts to direct said disk and topping knife to the individual beet; and springs adapted to bear against said rearwardly projecting arms and yield to the pressure of the beet engaging arms to return said shafts to normal position.

2. A beet topping device comprising an inverted U-shaped member; a vertical bar pivotally suspended from said member; horizontally disposed angled braces secured on said bar; rocking shafts carried in said braces; a rearwardly projecting arm on the upper portion of each of said shafts; springs to normally hold said arms parallel; curved spring arms on the lower end of each of said rocking shafts adapted to raise the foliage of beets and press against the sides of the beets as the device is drawn along the row of beets; a disk journaled in said vertical bar having laterally projecting flanges thereon; and a topping knife carried in the rear end portions of said angled braces.

3. A beet topping device comprising a topping knife having a vertical portion and lateral side wings; a foliage splitting disk operatively mounted in advance of said topping knife; lateral flanges on said disk to limit the depth of its cut and thereby to adjust the horizontal plane of said side wings; means to shift said disk and knife laterally, said means consisting of rearwardly projecting arms, and curved arms adapted to contact with the individual beet and coacting with said rearwardly projecting arms yieldingly held parallel with the travel of the device; shafts to which said arms are secured; and braces fastened on said shafts and connected with the mounting of said disk and knife, whereby when said curved arms are moved laterally said movement will be imparted to said disk and knife.

4. A beet topping device comprising a sleeve vertically suspended from a beet digging machine; a bar operatively carried in said sleeve, the lower end of which is bifurcated; braces secured to and carried on said bar; rocking shafts operatively carried in said braces; rearwardly projecting arms on each of said rocking shafts yieldingly held normally parallel; curved arms on the lower end of each of said rocking shafts adapted to raise the foliage of beets and press against the sides of the beets to center the device over the crown of the beets; a disk journaled in the bifurcated portion of said bar and a topping knife vertically adjusted by said disk.

In testimony whereof I have affixed my signature.

MARION A. SMITH.